United States Patent
Skells

Patent Number: 6,088,367
Date of Patent: Jul. 11, 2000

[54] COMPUTER BOOKING SYSTEM

[75] Inventor: Michael J Skells, Suffolk, United Kingdom

[73] Assignee: British Telecommunications plc, London, United Kingdom

[21] Appl. No.: 08/983,635

[22] PCT Filed: Jul. 1, 1996

[86] PCT No.: PCT/GB96/01590

§ 371 Date: Feb. 12, 1998

§ 102(e) Date: Feb. 12, 1998

[87] PCT Pub. No.: WO97/04408

PCT Pub. Date: Feb. 6, 1997

[30] Foreign Application Priority Data

Jul. 24, 1995 [EP] European Pat. Off. .............. 95305198
Nov. 13, 1995 [GB] United Kingdom .................... 9523206

[51] Int. Cl.$^7$ .................................................. G01R 31/08
[52] U.S. Cl. .......................... 370/468; 370/232; 370/465; 705/8
[58] Field of Search ..................................... 370/537, 255, 370/329, 341, 431, 229, 232; 705/7, 8, 9, 10

[56] References Cited

U.S. PATENT DOCUMENTS

| | | | |
|---|---|---|---|
| 4,788,643 | 11/1988 | Trippe .......................................... | 705/6 |
| 4,829,443 | 5/1989 | Pintsov .................................. | 705/406 |
| 5,295,065 | 3/1994 | Chapman ................................... | 705/8 |
| 5,623,489 | 4/1997 | Cotton ..................................... | 370/381 |
| 5,649,085 | 7/1997 | Lehr ........................................... | 705/4 |
| 5,848,395 | 12/1998 | Edgar ......................................... | 705/9 |

FOREIGN PATENT DOCUMENTS

0644499  3/1995  European Pat. Off. .

OTHER PUBLICATIONS

Proceedings of the 1994 Summer Computer Simulation Conference, Jul. 18–20, 1994, San Diego, CA, USA, pp. 102–107, Narayanan et al, "Resource simulation using linked lists".

*Primary Examiner*—Ajit Patel
*Assistant Examiner*—Ricardo M. Pizarro
*Attorney, Agent, or Firm*—Nixon & Vanderhye p.c.

[57] ABSTRACT

A computer booking system is provided for booking individual ones of a set resources to users of the resources. The resources may be, for example, channels between multiplexes in a telecommunications network. The database creates a pair of data nodes for each booking. Each node has a user field for specifying the user for whom the booking is scheduled, an event field for specifying whether the event associated with the node is the beginning or end of a booking, and a time field for specifying the time at which the event is scheduled to occur. Each node is also located in a single linked list (the time list) of nodes in which the nodes are arranged in order of their event times. Each node is also located in a respective of a set of lists (the value lists). The value lists are arranged in order of rank and each new node is located in the value list of the lowest possible rank. The database also has a time structure which points to the beginning of the time list and a value structure which is divided into a set of elements which are equal in number to the number of resources. Each element of the value structure has a pointer for pointing to the first node of a respective one of the value lists.

15 Claims, 8 Drawing Sheets

COMPUTER BOOKING SYSTEM

BACKGROUND OF THE INVENTION

1. Field of the Invention

This invention relates to a computer booking system for booking resources to users of the resources and particularly, but not exclusively, to a computer booking system for booking resources of a telecommunications network to users of the network. This invention also relates to a method of operating a computer booking system for booking resources to users.

2. Related Art

The problem of providing a booking system for booking resources which has to cope with a relatively small number of requests for use of the resources is easy to solve. Such a booking system may be implemented in either a paper-based form or a computer-based form. However, it is sometimes required to provide a booking system for booking resources which has to cope with a relatively large number of requests for use of the resources. For example, in a telecommunications network, it may be required to provide a booking system for booking individual channels of the network which has to cope with a large number of requests for use of the channels at various future time periods. The problem of providing such a booking system is not easy to solve.

SUMMARY OF THE INVENTION

According to one aspect of this invention, there is provided a computer booking system for booking individual ones of a set of resources to users of the resources, said computer booking system comprising:

means for booking resources to users, said booking means being arranged to create one or a pair of data nodes for each booking;

each data node being associated with an event relating to an individual booking and having a time field for specifying the time at which the event is scheduled to occur;

each data node having or being associated with means for specifying the event associated with the node;

each node being located in a single linked list (the time list) of nodes in which the nodes are arranged in order of their event times;

each node also being arranged in a respective one of a set of lists (the value lists), in each value list the nodes being arranged in order of their event times, the value lists being arranged in order of rank, and the booking means being arranged to locate each new node in the value list of the lowest possible rank.

According to another aspect of this invention there is provided a computer providing a booking system for booking individual ones of a set of resources to users of the resources, said computer comprising a processor, means for inputting data, means for displaying data and a memory containing a program for controlling the computer;

said program being arranged to make bookings of resources to users by creating one or a pair of data nodes for each booking;

each data node being associated with an event relating to an individual booking and having a time field for specifying the time at which the event is scheduled to occur;

each data node having or being associated with means for specifying the event associated with the node;

each node being located in a single linked list (the time list) of nodes in which the nodes are arranged in order of their event times;

each node being located in a respective one of a set of lists (the value lists), in each value list the nodes being arranged in order of their event times, and the value lists being arranged in order of rank; and said program being arranged to locate each node in the value list of the lowest possible rank.

The meaning of the term "user" as used herein is intended to include equipment. For example, in the case of a booking system for resources forming part of a telecommunications network, the users may be other parts of the network, other networks, or terminal equipment belonging to individuals or organisations.

According to a further aspect of this invention there is provided a method of operating a computer booking system for booking individual ones of a set of resources to users of the resources, said method comprising the steps of:

creating a new pair of data nodes for each booking of a resource to a user;

each data node being associated with an event relating to an individual booking and having a time field for specifying the time at which the event is scheduled to occur;

each node having or being associated with means for specifying the event associated with the node;

each node being located in a single linked list (the time list) of nodes in which the nodes are arranged in order of their event times;

each node also being located in a respective one of a set of lists (the value lists), in each value list the nodes being arranged in order of their event times and the value lists being arranged in order of rank; and locating each new node in the value list of the lowest possible rank.

The booking system of this invention provides a particularly elegant solution to the problem of providing a booking system for booking resources which can cope with a large number of requests for use of the resources.

This invention will now be described in more detail, by way of example, with reference to the drawings in which.

BRIEF DESCRIPTION OF THE DRAWINGS

DETAILED DESCRIPTION OF EXEMPLARY EMBODIMENTS

Figure 1:
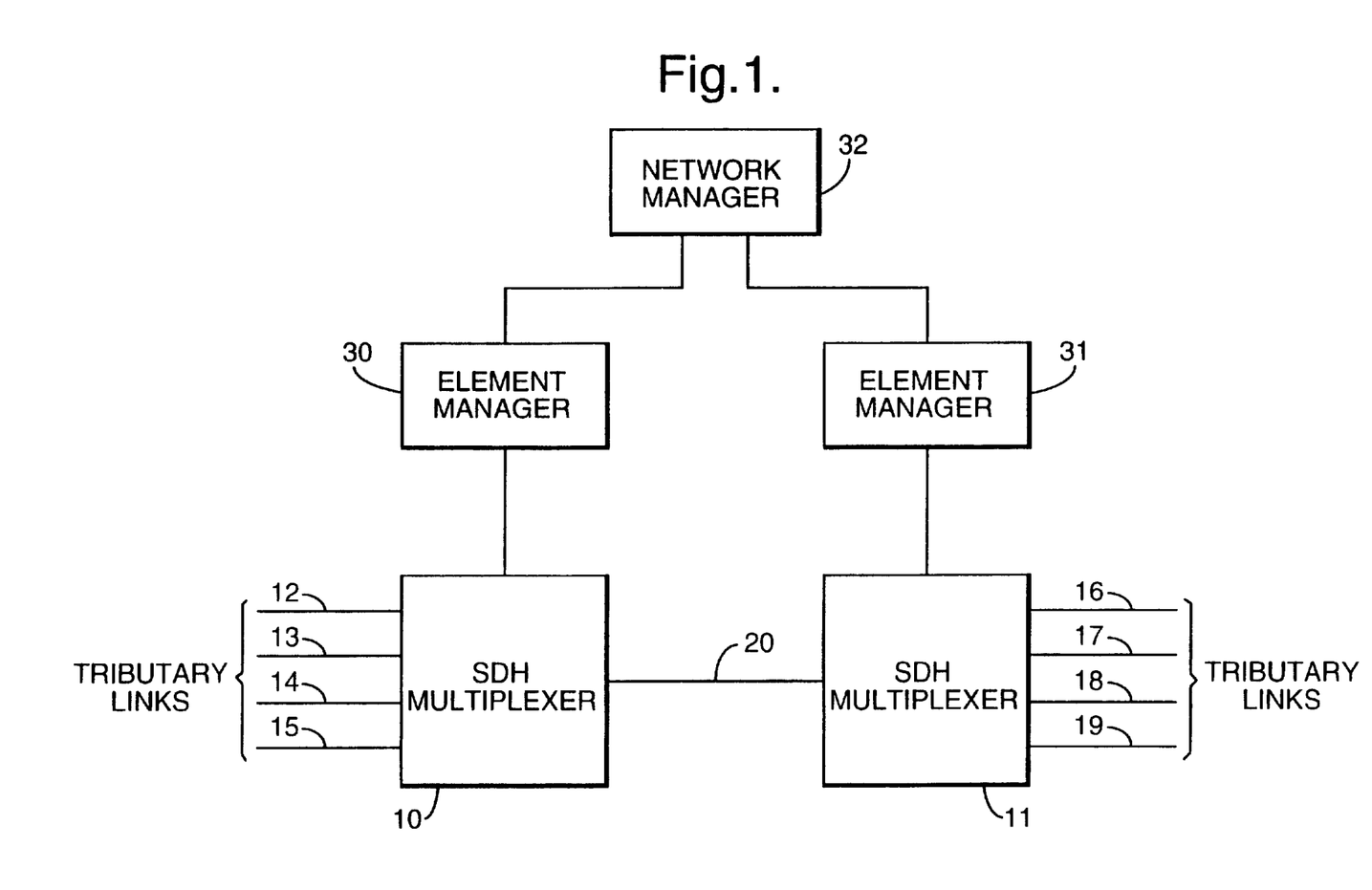
FIG. 1 is a block diagram of some elements of a telecommunications network in which a computer booking system embodying this invention is used for booking channels.

Referring now to FIG. 1, there are shown some of the elements of a telecommunications network. These elements include a pair of synchronous digital hierarchy (SDH) multiplexers 10, 11. The multiplexers 10, 11 form part of a network of multiplexers and associated asynchronous transfer mode (ATM) switches which are connected together so as to carry telecommunications traffic. The SDH multiplexer 10 receives and transmits telecommunications traffic on tributary links 12–15 and the multiplexer 11 receives and transmits traffic on tributary links 16–19. Between multiplexers 10 and 11, traffic is transmitted on a link 20. An SDH multiplexer is capable of receiving traffic on its tributary links of varying data rates. In some of the tributary links, a set of channels will have already been combined by time division multiplexing. An SDH multiplexer subjects traffic which it receives on tributary links to time division multiplexing and transmits the traffic multiplexed in this way on a single outgoing link. Between two SDH multiplexers, for example multiplexers 10 and 11, a single link will thus carry a large number of individual channels. The maximum number of channels which can be carried between two multiplexers will depend upon the data rates of the channels and the data rate used in the transmission between the two multiplexers. Between two high order SDH multiplexers, several hundred or even several thousand channels may be carried over a single link.

Figure 2:
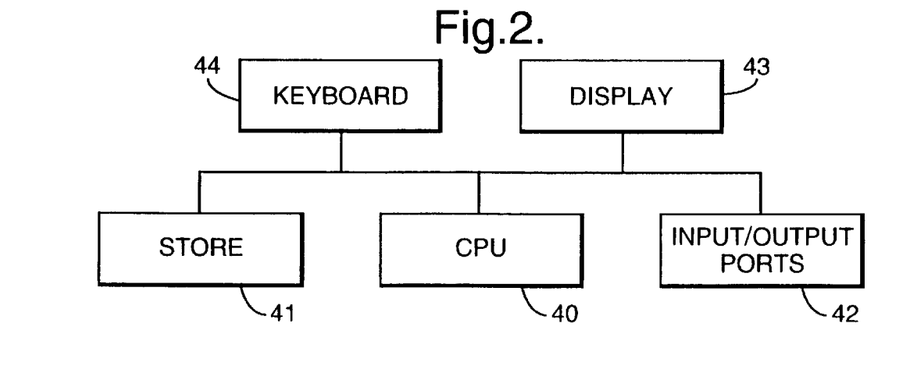
FIG. 2 is a block diagram of the components of a computer which may be used to form the network manager or one of the element managers shown in FIG. 1.

In the network shown in FIG. 1, the multiplexers 10, 11 are managed, respectively, by element managers 30, 31 and the element managers 30, 31 are managed by a network manager 32. Although not shown, the network manager 32 also manages other element managers which in turn manage other elements of the telecommunications network. The construction of element managers and network managers is well known to those skilled in the art and so the construction of the network manager 32 and element managers 30 and 31 will not be described in detail. Both network managers and element managers are implemented as computers. As shown in FIG. 2, the main components of a computer comprise a central processing unit (CPU) 40, a store 41 which typically comprises both hard disk memory and random access memory (RAM), input/output ports 42, a display 43 which usually takes the form of a visual display unit and a keyboard 44 for receiving instructions from the operator. Store 41 holds the program for controlling the computer and stores data. Each of the multiplexers 10 and 11 is controlled by a computer which forms part of the multiplexer.

In accordance with this invention, the network shown in FIG. 1 includes a booking system for holding data relating to the booking of the individual channels between multiplexers 10 and 11 to the users of the channels. The users of the channels may be other parts of the network, other networks, or terminal equipment belonging to individuals or organisations. The booking system could be implemented as part of the network manager 32, part of one of the element managers 30 and 31, or as part of the computer controlling one of the multiplexers 10 and 11. In the present example, the booking system is implemented as part of network manager 32. Thus the program for controlling the booking system forms part of the program of network manager 32 and the store 41 of network manager 32 is responsible for storing the data.

Figure 3:
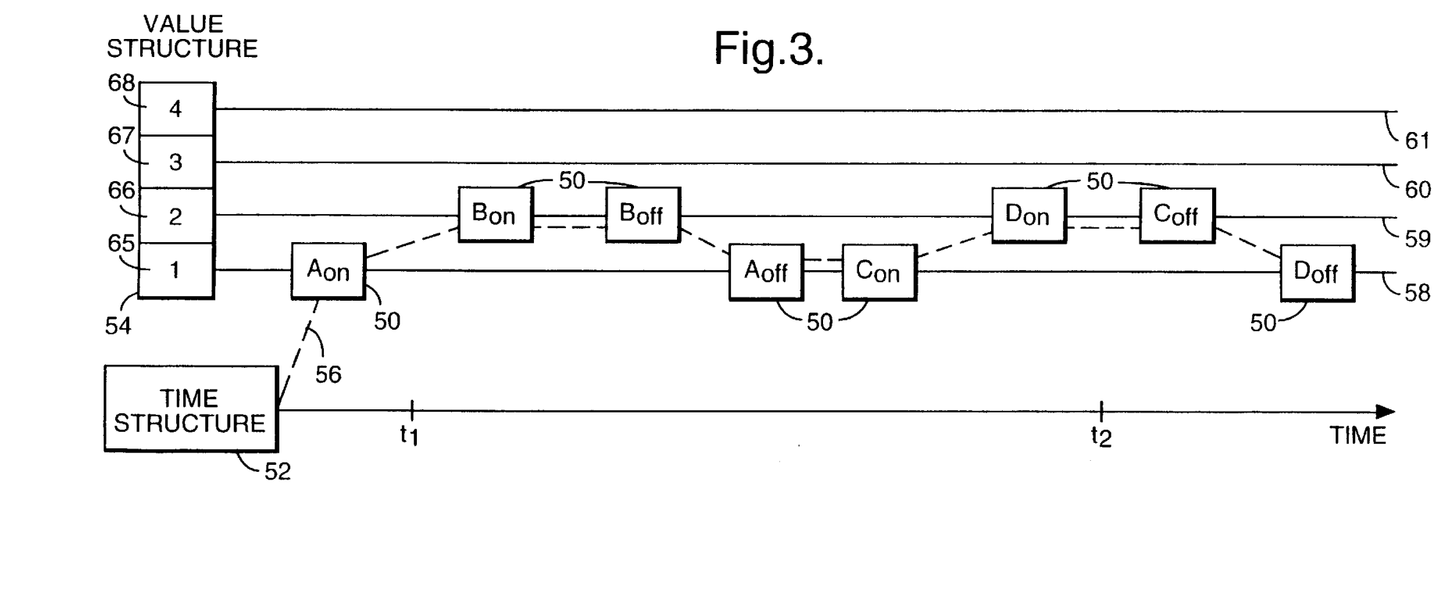
FIG. 3 illustrates the arrangement of data nodes, time structure and value structure in the computer booking system embodying this invention.

Referring now to FIG. 3, this illustrates the data structures used in the booking system. These data structures comprise a set of data nodes 50, a time structure 52 and a value structure 54. The data nodes 50 contain data relating to the individual bookings, a pair of nodes being used for each booking. Each node contains data either relating to the beginning of a booking of a channel or data relating to the end of a booking of channel. Thus, for example, nodes Aon and Aoff, respectively, contain data relating to the beginning and end of booking A.

Similarly, nodes Bon and Boff, nodes Con and Coff, and nodes Don and Doff contain data relating to bookings B, C and D. For reasons of simplicity, FIG. 3 only shows a small number of data nodes 50 but in practice the booking system would contain a very much larger number of nodes.

The nodes 50 are located in a single linked list (the time list) of nodes in which the nodes are arranged in time order. The linked list is indicated in FIG. 3 by dashed line 56. Each of the nodes 50 is also located in a respective one of a set of lists (the value lists). FIG. 3 shows four value lists and these are indicated by solid lines 58–61. In the example shown in FIG. 3, the nodes Aon, Aoff, Con and Doff are on value list 58. Nodes Bon, Boff, Don and Coff are on value list 59.

The value lists are arranged in order of rank. The value lists are equal in number to the number of channels which may be booked. However, the value lists are associated with the channels on a cumulative bases as bookings are made rather than on an actual basis. Thus, value lists 58–61 are associated with channels 1–4 on a cumulative basis. Thus, node Aon, which is the node for the commencement of booking for booking A, is placed on the value list for cumulative channel 1. Node Bon, which represents the commencement of the booking period for booking B, is located on the value list for cumulative channel 2 as cumulative channel 1 is in use at the commencement of the booking period of booking B. However, at the time at which booking B begins, the user will be allocated to one of the actual channels which is free, and this channel may or may not be actual channel 2. As will become apparent from the description which follows, each new node is located on the value list of the lowest possible rank.

For reasons of simplicity, FIG. 3 shows only four value lists and thus the data structure shown in FIG. 3 is suitable for booking only four channels. However, the booking system of the present invention is suitable for booking a much larger number of channels, for example several hundred or even several thousand channels, and so in practice there will be a much larger number of value lists. Also, for reason of simplicity, FIG. 3 shows bookings over a short time period. However, the booking system of FIG. 3 is suitable for making bookings over a long or indefinite time period. The booking system of FIG. 3 is capable of dealing with a very large number of bookings.

The time structure 52 points to the beginning of the time list 56. The value structure 54 is divided into four elements 65, 66, 67 and 68 which are associated, respectively, with value lists 58-61. Thus, elements 65–68 are associated, respectively, with the value lists for cumulative channels 1–4. For ease of identification, numerals 1–4 have been written inside the blocks representing elements 65–68.

The fields of nodes 50, time structure 52 and the individual elements of value structure 54 will now be described with reference to FIGS. 4 to 6.

Figure 4:
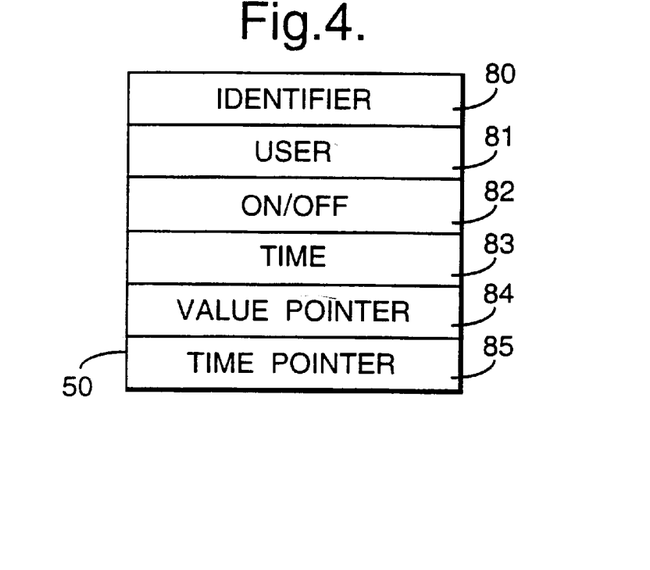
FIG. 4 shows the fields of each of the data nodes shown in FIG. 3.

Referring now to FIG. 4, there are shown the fields for each of the nodes 50. These fields comprise an IDENTIFIER field 80, a USER field 81, an ON/OFF field 82, a TIME field 83, a VALUE POINTER field 84 and a TIME POINTER field 85. In more detail, the IDENTIFIER field 80 contains the identifier for the node and the USER field 81 contains an identification of the user. The ON/OFF field 82 specifies whether the event associated with the node is the beginning or end of the booking. In field 82, if the event is the beginning of the booking, the field is set to a value ON. If the event is at the end of a booking, this field is set to a value OFF. A node which represents the beginning of a booking will be hereinafter referred as an ON node and a node which represents the end of a booking will be referred to as an OFF node. The TIME field 83 specifies the time at which the event occurs. The VALUE POINTER 84 points to the next node in the same value list and the TIME POINTER field 85 points to the next node on the time list 56.

By way of modification, in place of the USER field 81, the details of the user could be stored separately from the node. Also, in place of the ON/OFF field 82, the details of the event associated with the node could be stored separately.

Figure 5:
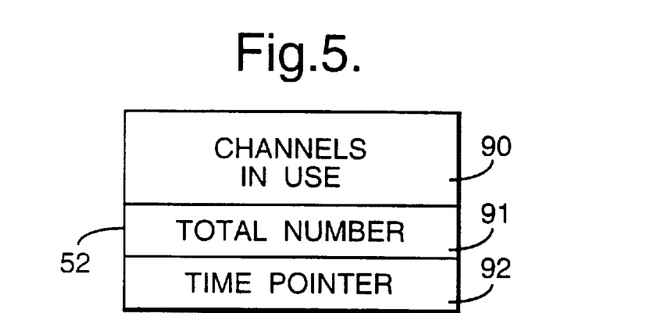
FIG. 5 shows the fields of the time structure shown in FIG. 3.

Referring now to FIG. 5, there are shown the fields of the time structure 52. These fields comprise a CHANNELS IN USE field 90, a TOTAL NUMBER field 91 and a TIME POINTER field 92. The CHANNELS IN USE field 90 specifies the number of actual channels which are in use at the current time, the TOTAL NUMBER field 91 specifies the total number of channels on the link 20 and the TIME POINTER field 92 points to the beginning of the time list 56.

Figure 6:
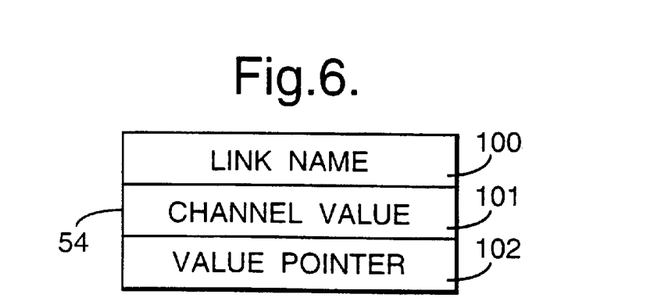
FIG. 6 shows the fields of the value structure shown in FIG. 3.

Referring now to FIG. 6, there are shown the fields of each element of the value structure 54. These fields comprise a LINK NAME field 100, a CHANNEL VALUE field 101 and a VALUE POINTER field 102. The LINK NAME field 100 contains the identifier for the link, which in the present example is link 20. The CHANNEL VALUE field 101 specifies the cumulative channel with which the element is associated. Thus, for example, in the case of the element 65, the CHANNEL VALUE field specifies channel 1. The VALUE POINTER field 102 points to the beginning of the value list with which the element is associated. Thus, for example, in the case of element 65, the VALUE POINTER field points to node Aon.

In operation, in order to find the beginning of the time list 56, the TIME POINTER field 92 of the time structure 52 is read. Then, the time list can be scanned from left to right (as viewed in FIG. 3) by reading the TIME POINTER fields of the nodes. For example, after locating node Aon, the next node on the time list is found by reading the TIME POINTER field of this node. The TIME POINTER field of node Aon contains, in the present example, the identifier for node Bon. Similarly, in order to find the beginning of one of the value lists, the field VALUE POINTER of the appropriate element of the value structure 54 is read. The value list can be scanned by reading the VALUE POINTER fields of the nodes.

By way of modification, each node can be provided with a first pair of pointers for pointing, respectively, to the next node and the previous node in the same value list and a second pair of pointers for pointing, respectively, to the next node and the previous node in the time list.

Figure 7:
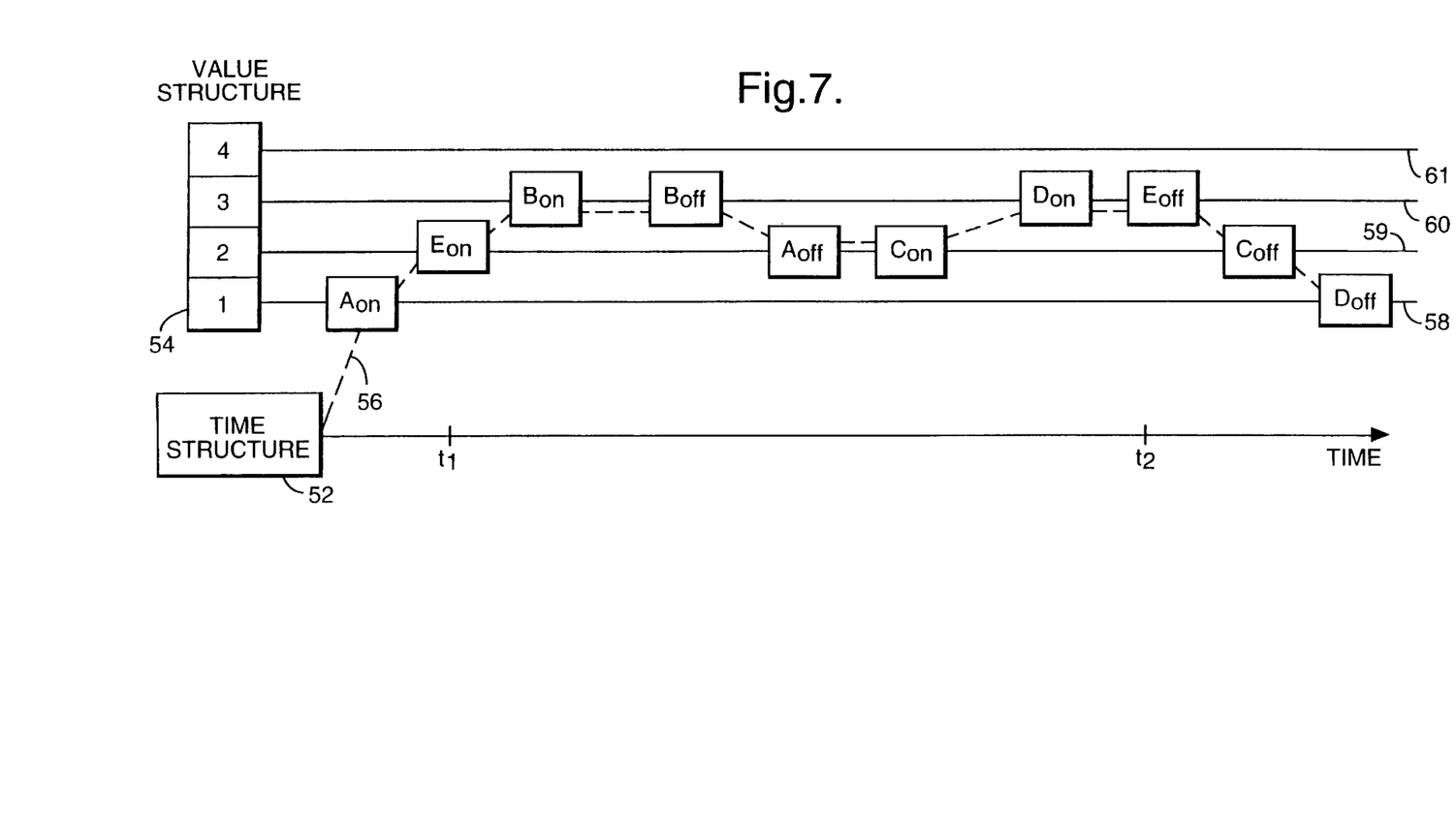
FIG. 7 shows how two further nodes may be added in order to make a new booking to the arrangement of nodes shown in FIG. 3.

Referring now to FIGS. 3 and 7 together, FIG. 3 shows the nodes which are necessary to specify bookings A to D and FIG. 7 shows the addition of two further nodes, namely nodes Eon and Eoff, in order to make booking E. Booking E commences at time t1 and ends at time t2. An ON node is located on the value list for the cumulative channel number which is equal to the number of channels which will be in use immediately following commencement of the booking. Immediately following the commencement of booking E, that is immediately after time t1, two channels will be in use. Therefore, node Eon on placed on the value list for cumulative channel 2. An OFF node is placed on the value list for the cumulative channel number which is equal to the number of channels which will be in use immediately before the end of the booking. Immediately before the end of the booking period for booking E, that is immediately before time t2, three nodes will be in use. Therefore, node Eoff is placed on the value list for cumulative channel 3. As may be observed by comparing FIGS. 3 and 7, as the result of adding nodes Eon and Eoff, each of the nodes between times t1 and t2 is raised onto a value list which is one value list higher in rank than its previous value list. Thus, nodes Aoff and Con are raised from the value list for cumulative channel 1 to the value list for cumulative channel 2. Similarly, nodes Bon, Boff and Don are raised from the value list for cumulative channel 2 to the value for cumulative channel 3.

The sub-routines for determining if a channel may be booked, making a new booking and removing an existing booking will now be described with reference to FIGS. 8 to 10. The sub-routines form part of the program of the booking system. The sub-routines will be described with reference to the examples shown in FIGS. 3 and 7.

Figure 8:
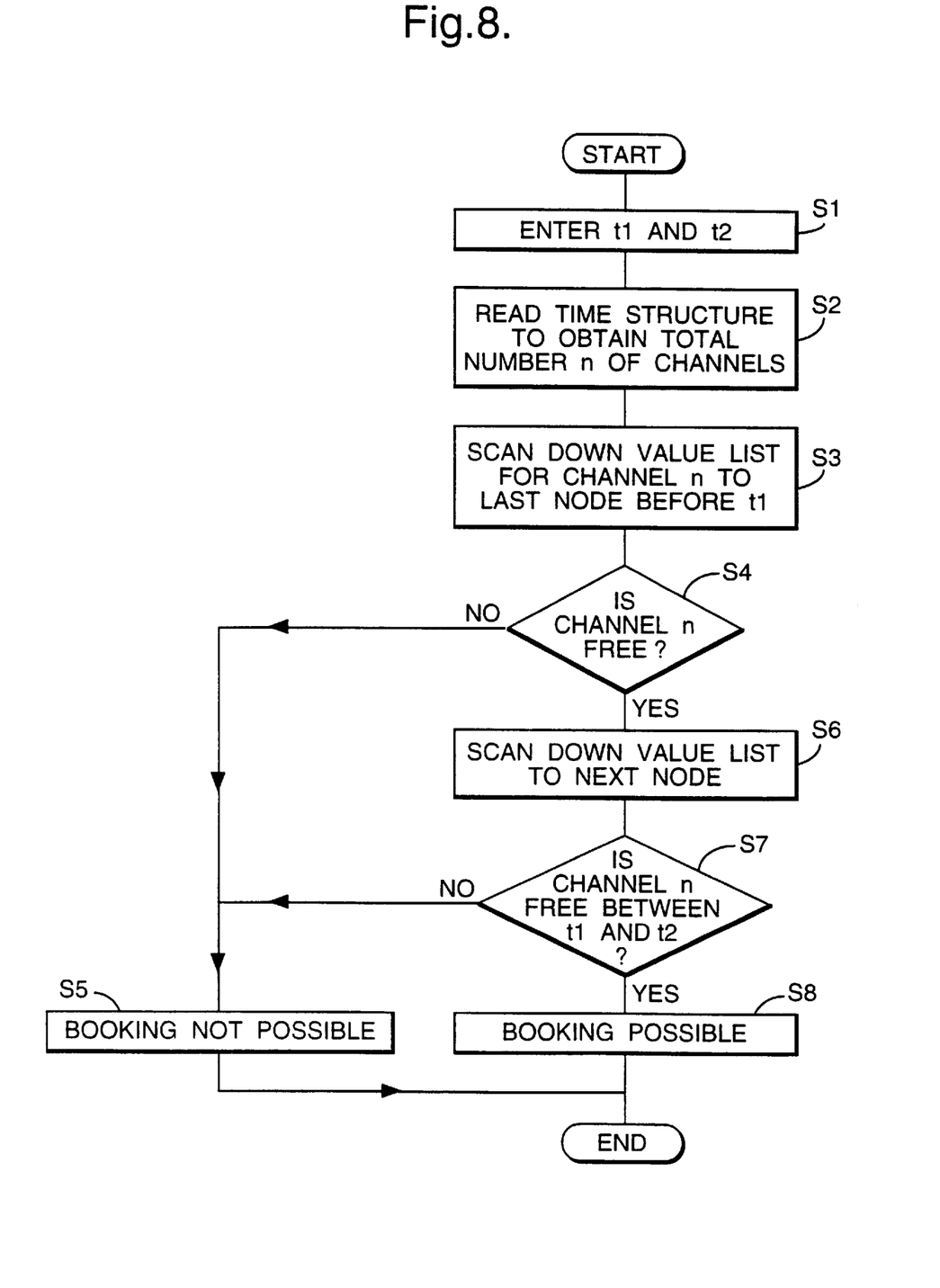
FIG. 8 is a flow chart of a program sub-routine used in the booking system of FIG. 3 for determining if a channel may be booked to a user between times t1 and t2.

Referring now to FIG. 8, there is shown the sub-routine for determining if a channel may be booked to a user between times t1 and t2. After entering this sub-routine, in a step S1, the operator of the booking system enters the desired beginning and end times of the booking, namely times t1 and t2.

Then, in a step S2, the sub-routine reads the time structure 52 to obtain the total number n of channels which may be booked. In the present example, the link has four channels and so a value 4 is returned.

Next, in a step S3, the value list for cumulative channel n is scanned to the last node before time t1. In the example shown in FIG. 3, there are no nodes located on the value list 61 for cumulative channel 4 and so the scanning operation proceeds no further than element 68 of value structure 54.

In step S4, it is determined if cumulative channel n is free before time t1. If channel n is not free at this time, the sub-routine proceeds with step S5 in which it is displayed to the user that a booking is not possible. The sub-routine ends after step S5.

If it is found in step S4 that channel n is free, the sub-routine continues with step S6. In the example shown in FIG. 3, as there are no nodes located on the value list for cumulative channel 4, the sub-routine goes from step S4 to step S6.

In step S6, the sub-routine scans down the value list for cumulative channel n to the next node. Then, in step S7, it is determined if channel n is free between times t1 and t2. If channel n is not free between these two times, the sub-routine jumps to step S5 so that the operator is informed that a booking is not possible. If in step S7 it is found that channel n is free between times t1 and t2, the sub-routine continues with step S8 in which it is displayed that a booking is possible. If there is at least one node before time t1, channel n will be free at time t1 if the last node is an OFF node. If there is also a node after time t1, that node will be an off node and channel n will be free between t1 and t2 if that OFF node is after time t2. The sub-routine ends after step S8.

In the present example, as there are no nodes located on the value list for channel 4, the sub-routine goes from step S7 to step S8 and the user is informed that a booking is possible.

Figure 9A:
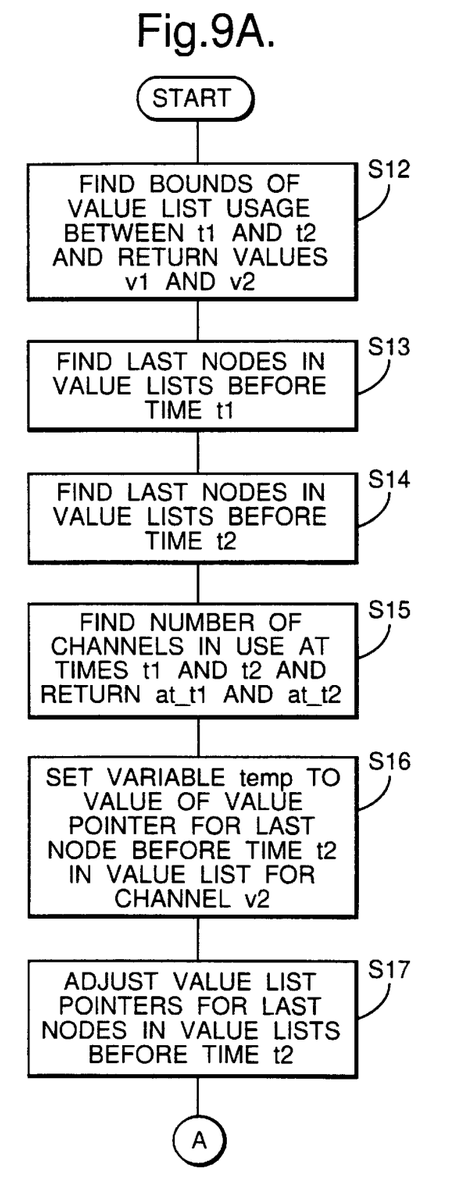
FIGS. 9A and 9B are a flow chart of a program sub-routine used in the booking system of FIG. 3 for making a new booking of a channel to a user between times t1 and t2.
Figure 9B:
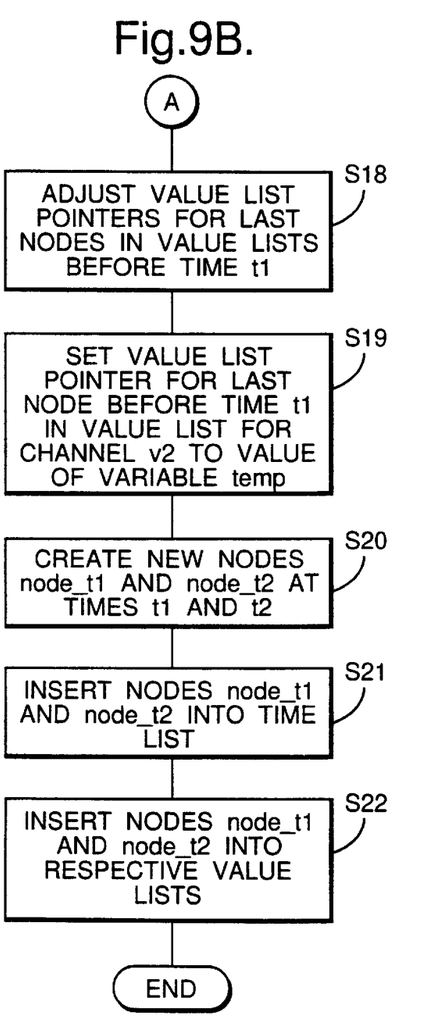

Referring now to FIG. 9, there is shown the sub-routine for making a new booking of a channel to a user between times t1 and t2. This sub-routine will be described with reference to making booking E and so reference will also be made to FIGS. 3 and 7 in describing this sub-routine.

After entering this sub-routine, in a step S12, the value list of highest rank and the value list of lowest rank on which nodes are located between times t1 and t2 are found. This is done by scanning along the time list between times t1 and t2. The numbers of the cumulative channels represented by these value lists of highest and lowest rank are returned as values v1 and v2. Thus, in the example of adding booking E, values v1 and v2 are, respectively, 2 and 1.

Then, in a step S13, the last nodes in the value lists before time t1 are found for each value list in turn commencing with the value list for channel (v1+1) and ending with the value list for the cumulative channel v2. Where appropriate, an element of the value structure 54 is identified as a node. Thus, in the example of adding booking E, the elements 67 and 66 of the value structure and node Aon are identified.

Then, in a step S14, the last nodes in the value lists before time t2 are found for each value list in turn commencing with the value list for cumulative channel (v1+1) and ending with the value list for the cumulative channel v2.

Thus, in the example of adding booking E, element 67 of the value structure and nodes Don and Con are identified.

In step S15, the number of channels scheduled to be in use at times t1 and t2 are found and stored as values at at_t1 and at at_t2. The value at_t1 is found by scanning along the time list to the first node after time t1. Then, the value list on which this node is located is scanned to its end. In the case of the last node of the value list, the VALUE POINTER field holds the number of the channel it represents. If the first node after time t1 is an OFF node, then the number of the channel which the value list represents is equal to the number of channels scheduled to be used at time t1. If this node is an ON node, then the number of channels in use will be one less than this. The number of channels scheduled to be in use at time t2 is found in analogous manner.

In the example of adding booking E, the number of channels scheduled to be used at time t1 is one and the number of channels scheduled to be in use at time t2 is two.

Next, in a step S16, a variable temp is set to the value of the VALUE POINTER field for the last node before time t2 in the value list for channel v2. Thus, in the example of adding booking E, the variable temp is set to the value of the VALUE POINTER field of the node Con.

Next, in a step S17, the value list pointers for the last nodes in the value lists before time t2 are adjusted. This operation commences with the last node in the value list for channel v2 before time t2 and ends with the last node in the value list for channel v1 before time t2. For each node, the VALUE POINTER field is set to the value of the VALUE POINTER field of the last node before t2 in the value list of one rank higher.

Thus, in the example of adding booking E, the VALUE POINTER field of node Con is set to the value of the VALUE POINTER field of node Don. The VALUE POINTER field of node Don is set to the value of the VALUE POINTER field of the element 67 of the value structure for channel 3.

Next, in a step S18, the value list pointers for the last nodes in the value lists before time t1 are adjusted. This operation commences with the last node in the value list for channel (v1+1) before time t1 and ends with the last node in the value list for channel (v2+1) before time t1. For each node, the VALUE POINTER is set to the value of the VALUE POINTER field of the last node before t1 in the value list of one rank lower.

Thus, in the example of adding booking E, the VALUE POINTER field of the element 67 of the value structure for channel 3 is set to the value of the VALUE POINTER field of the element 66 of the value structure for channel 2. Likewise, the value of the VALUE POINTER field of the element 66 of the value structure for channel 2 is set to the value of the VALUE POINTER field of node Aon.

Following step S18, in a step S19, the VALUE POINTER field for the last node before time t1 in the value list for channel v2 is set to the value of the variable temp. Thus, in the example of adding booking E, the VALUE POINTER field of node Aon is set to the variable temp.

As a result of performing steps S17, S18 and S19, each of the nodes between times t1 and t2 is raised into a value list of one rank higher than it previous value list.

Next, in a step S20, new nodes node_t1 and node_t2 are created as the ON and OFF nodes for the new booking. In the case of node_t1, the IDENTIFIER field is set to node_t1, the USER field is set to an identifier for the intended user of the channel for the new booking, the ON/OFF field is set to ON and the TIME field is set to time t1. In the case of node_t2, the IDENTIFIER field is set to node_t2, the USER field is set to the identifier for the intended user, the ON/OFF field is set to OFF and the TIME field is set to time t2.

In the example of booking E, the new nodes node_t1 and node_t2 are, in fact, nodes Eon and Eoff.

Following step S20, in a step S21, node node_t1 and node_t2 are inserted into the time list 56 at times t1 and t2, if appropriate, after any other node or nodes which may be already located in the time list at one or both of these times.

Thus, in the example of booking E, node Eon is inserted in the time list between nodes Aon and Bon and node Eoff is inserted into the time list between Don and Coff.

Finally, in a step S22, node node_t1 and node_t2 are inserted into their respective value lists.

In the case of node_t2, this is achieved by setting the VALUE POINTER field of node_t2 to the value of the VALUE POINTER field of the last node currently located on the value list for channel (at_t2+1) before time t2. Also, the VALUE POINTER field of the last node before time t2 for channel (at_t2+1) is set to the identifier for node_t2.

In the case of node_t1, the VALUE POINTER field of this node is set to the value of the VALUE POINTER field of the last node before time t1 on the channel list for channel (at_t1+1). Also, the VALUE POINTER field for the last node before t1 on the value list for channel (at_t1+1) is set to point to the node node_t1.

In the example of adding booking E, and as shown in FIG. 7, as a result of step S22, nodes Eon and Eoff are located respectively on the value lists for channels 2 and 3.

By way of modification, the sub-routine shown in FIG. 9 may include a facility to make a series of bookings for a user, for example a booking for a particular period in each week for a desired number of weeks.

Figure 10A:
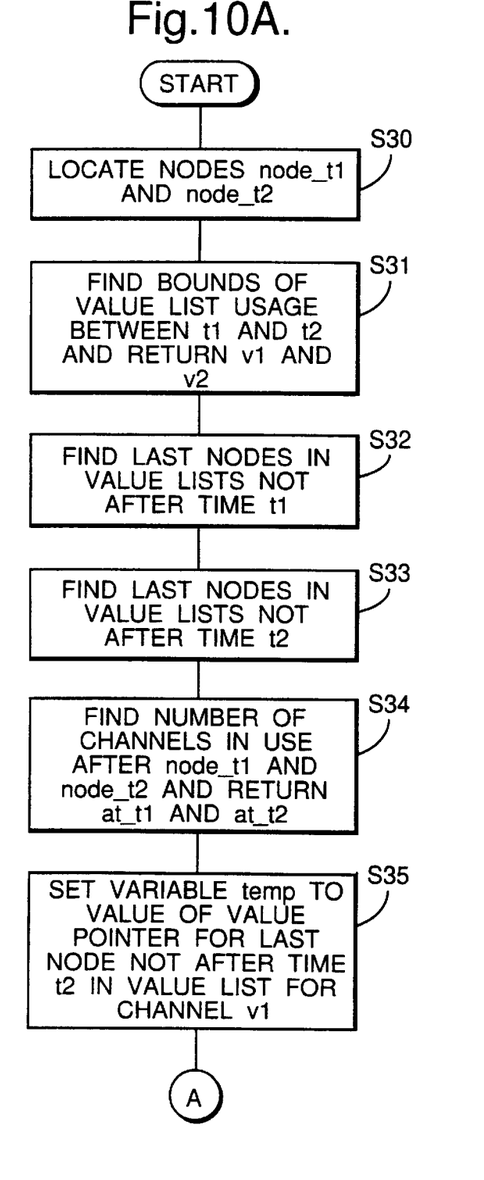
FIGS. 10A and 10B are a flow chart of a program sub-routine used in the booking system of FIG. 3 for removing an existing booking of a resource from a user between times t1 and t2.
Figure 10B:
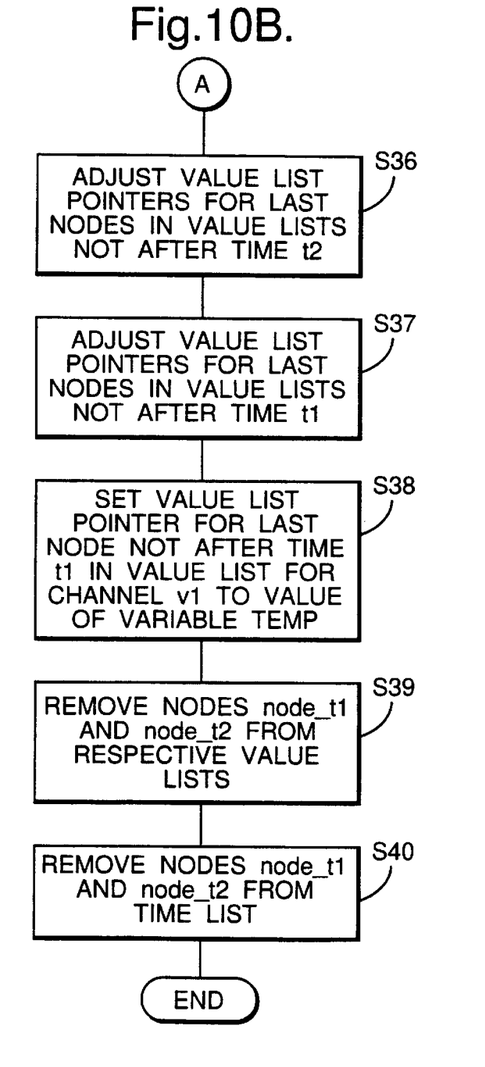

Referring now to FIG. 10, there is shown the flow chart for the subroutine for removing an existing booking of a channel from the user between times t1 and t2. The operation of this sub-routine will be described with reference to removing booking E and thus returning the booking structure from the arrangement shown in FIG. 7 to that shown in FIG. 3.

After entering this sub-routine, in a step S30, the ON and OFF nodes for the booking are located by scanning down the time list. These nodes are designated as node t1 and node t2. If there are other nodes at t1 or t2, the value pointers of the nodes are adjusted so that nodes node_t1 and node t2 are the last node in the value lists at each of these times. In the example of booking E, nodes Eon and Eoff are located.

Then, in a step S31, the bounds of usage of the value lists between times t1 and t2 are found and returned as values v1 and v2. Thus, the bounds of usage include the value list of highest rank and the value list of lowest rank on which nodes are located between times t1 and t2. The time period is considered to commence immediately after the node node_t1 and end immediately after the node node_t2. In the present example, v1 and v2 have values 3 and 2.

Next, in a step S32, the last nodes are found in the value lists which are not after time t1. This operation is performed for the value lists between the value list for channel v1 and the channel list for value (v2−1). These include the node node_t1. In the example of removing booking E, in step S32 the element of the value structure for channel 3 and nodes Eon and Aon are found.

Next, in a step S33, the last node in the value lists not after time t2 are found for the same range of value lists as in step S32. Thus, in this step, the nodes which are found include node_t2. In the example of removing booking E, in step S33, nodes Eoff, Con and Aon are found.

In step S34, the number of channels in use are found immediately after node node_t1 and immediately after the node node_t2 and values at at_t1 and at_t2 are returned. These values are found by scanning along the time list. In the example of removing booking E, both values at_t1 and at_t2 are set to 2.

In a step S35, a variable temp is set to the value of the value pointer for the last node not after time t2 on the value list for channel v1. In the example of removing booking E, the variable temp is set to the value of the value pointer for node Eoff which indicates that it is the last node in the value list for channel 3.

In a step S36, the value list pointers for the last nodes in the value lists not after time t2 are adjusted. This operation is performed for each value list commencing with the value list for channel v1 and ending with the value list for the channel v2. For each of these nodes, the VALUE POINTER field is set to the value of the VALUE POINTER field for the node not after time t2 in the value list of one rank lower.

Thus, in the example of removing booking E, the value pointer of node Eoff is adjusted so that it points to node Coff and the value pointer of Con is adjusted so that it points to node Doff.

Next, in a step S37, the value pointers are adjusted for the last nodes in the value lists not after time t1. This operation is performed for the value lists which commence with the value list for channel (v2−1) and ending with the value list for the channel (v1−1). For each of these nodes, the VALUE POINTER field is set to the value of the VALUE POINTER field for the node not after t1 in the value list of one rank higher. Thus, in the example of removing booking E, the value pointer of node Aon points to node Aoff and the value pointer of node Eon points to node Bon.

After step S37, in a step S38 the VALUE POINTER field for the last node not after time t1 in the value list for channel v1 is set to the value of the variable temp. Thus, in the example of removing booking E, the element of the value structure for channel 3 indicates that this is the last node of the value list for channel 3.

As a result of performing steps S36, S37 and S38 all the node in the period which commences immediately after time t1 and ends immediately after time t2 are lowered into value lists of one rank lower. In the example of removing booking E, node Bon, Boff, Aoff, Con, Don and Eoff are all lowered into the value lists which are one rank lower than their previous value lists.

After step S38, in a step S39, nodes node_t1 and node_t2 are removed from their respective value lists. This is achieved by adjusting the value pointer for the last node not after t1, and not node_t1 itself, in channel at_tl to the value of the value pointer for node_t1. Also, the last node not after t2, and excluding node_t2 itself, is set to the value of the value pointer of node_t2.

Finally, in a step S40, nodes node_t1 and node_t2 are removed from the time list.

As a result of performing step S39 and S40, nodes node_t1 and node_t2 are removed from both the value lists and the time list. In the example of removing booking E, nodes Eon and Eoff are removed at this stage.

Figure 11:
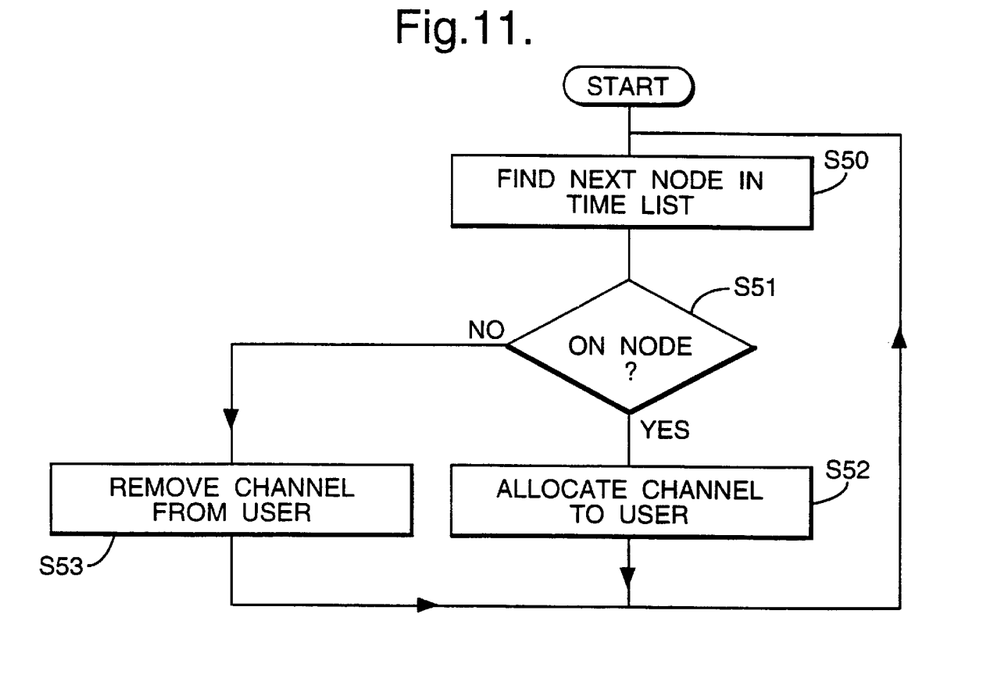
FIG. 11 is a flow chart of a program sub-routine used in the booking system of FIG. 3 which is used for allocating and removing channels from users at the beginning and end of each booking.

Referring now to FIG. 11, there is shown the flow chart of the subroutine for allocating channels to users at the beginnings of booking periods and removing channels from users at the ends of booking periods. In a step S50, the sub-routine scans along the time list and finds the next node after the present time. In a step S51, it inspects the node to determine if it is an ON node or an OFF node. If it is an ON node, in a step S52, at the beginning of the booking period scheduled on the next node, it allocates one of the free channels to the user in whose name the booking is made. The sub-routine then returns to step S50 and scans along the time list to find the next node.

If in step S51 it is found that the next node is an OFF node, the subroutine jumps to step S53. The next node will specify a user who is presently using one of the channels and the time at which his booking is scheduled to end. In step S53, the sub-routine removes this channel from the user.

Thus, as a result of steps S51 to S53, a channel is made available to the respective user at the beginning of each booking period and made unavailable to that user at the end of the booking period. It is to be noted that the channel which is made available to a user at the beginning of each booking period is one of the free actual channels and that the cumulative channel numbers used in the booking system are not used for this purpose.

The flow charts of FIGS. 9 to 11 refer to bookings each of which commences and ends at fixed times. By way of modification, the booking system of the invention may also be used for making bookings each of which commences at a fixed time and continues indefinitely. When making such a booking, only an ON node is created.

Although the present invention has been described with reference to booking channels between two SDH multiplexers, it is suitable for general use for booking individual ones of a set of resources. For example, in the case of the network elements shown in FIG. 1, the booking system may also be used for booking of channels through one of the SDH multiplexers 10, 11. By way of a further example, in a telecommunications network, it could be used for booking ports for a communications link. By way of a general example, it could be used for booking items hired out by a hire company.

The present invention is particularly suitable for holding data relating to the booking of individual ones of a set of resources when there are a large number of resources in the set. However, as the number of nodes in each list increases, with only a single pointer at each node, the process of scanning along the time and value lists can be relatively time consuming. In order to increase scanning speed, a technique known as skip lists may be used. In this technique, some of the nodes have additional pointers which look further ahead than the next node. For example, on average, half the nodes could be provided with only one pointer so that each of these nodes points only to the node directly in front of it. The other half of the nodes are provided with two pointers, one of which points to the next node and one of which points to two nodes ahead. Of this remaining half, one half could also have three nodes, the additional node pointing four ahead, and a quarter of the remaining half could be provided with four nodes with the fourth node looking eight nodes ahead. For a more detailed discussion of skiplists, reference is made to: "SkipLists", Bruce Schneier, Dr Dobbs' Journal, January 1994, pages 50–52.

What is claimed is:

1. A computer booking system for booking individual ones of a set of resources to users of the resources, said computer booking system comprising:
    means for booking resources to users, said booking means being arranged to create a pair of data nodes for each booking:
    each data node being associated with an event relating to an individual booking, the event being either the beginning or end of said individual booking and having a time field for specifying a time at which the event is scheduled to occur;
    each node having or being associated with a user field for specifying the user for whom the booking is made;
    each data node having or being associated with means for specifying the event associated with the node; and
    each node being located in a time linked list of nodes in which the nodes are arranged in order of their event times;
    each node being also arranged in a respective one of a set of value lists, in each said value list the nodes being arranged in order of their event times, said value lists being associated with the resources on a cumulative basis as bookings are made and arranged in order of rank, and the booking means being arranged to locate each new node in a value list of the lowest possible rank.

2. A computer booking system as in claim 1, in which, for each node, the means for specifying the event associated with the node comprises an event field which forms part of the node.

3. A computer booking system as in claim 1 including a time structure having a pointer for pointing to a first node in said time list, and a value structure having a set of elements equal in number to the resources in said set of resources, each element of the value structure having a pointer for pointing to a first node of a respective one of said value lists.

4. A computer booking system as in claim 1 including means for determining if a resource can be booked to a user between times t1 and t2, said determining means being arranged to scan a value list of highest rank between times t1 and t2 so as to determine whether one of the resources is free between these two times.

5. A computer booking system as in claim 1, in which each node has a time pointer for pointing to the next node in the time list and a value pointer for pointing to the next node in its value list.

6. A computer booking system as in claim 5, in which said booking means is arranged to make a booking of one of the resources for a user for a period beginning at time t1 and ending at time t2 by performing the operation of:
    creating a first node containing data relating to the beginning of the booking period and a second node containing data relating to the end of the booking period;
    adjusting value pointers of the nodes just before times t1 and t2 so that each of the nodes between times t1 and t2 is raised into one of said value lists which is one higher in rank;
    inserting the first and second nodes into said time list;
    inserting the second node into a respective one of said value lists; and
    inserting the first node into the respective one of the value lists.

7. A computer booking system as in claim 5 including means for removing a booking of one of the resources which is scheduled to begin at a time t1 and end at a time t2 by performing the operations of:
    finding one of said nodes which contains data relating to the beginning of the booking and the node which contains data relating to the end of the booking;
    adjusting value pointers of the nodes just before times t1 and t2 so that each of the nodes between times t1 and t2 is lowered into a value list which is one value list lower in rank than its previous value list;
    removing the nodes relating to the booking from its value list; and
    removing the nodes relating to the booking from the time list.

8. A telecommunications network comprising a network of elements for carrying telecommunications traffic and a computer booking system as in claim 1 for holding data relating to the booking of individual ones of a set of network resources to users of the resources.

9. A telecommunications network as in claim 8, further including means for making resources available to respective users at the times at which the bookings are scheduled to begin, and means for making resources unavailable to respective users at the times at which the bookings are scheduled to end.

10. A telecommunications network as in claim 8 in which the resources are telecommunications channels.

11. A method of operating a computer booking system for booking individual ones of a set of resources to users of the resources, said method comprising the steps of:
    creating a new pair of data nodes for each booking of a resource to a user;
    each data node being associated with an event relating to an individual booking, the event being either the beginning or the end of the individual booking and having a time field for specifying the time at which the event is scheduled to occur;
    each node having or being associated with a user field for specifying the user for whom a booking is made;
    each node having or being associated with means for specifying the event associated with the node; and each node being located in a time linked list of nodes in which the nodes are arranged in order of their event times;

each node being also located in a respective one of a set of linked value list, in each value list the nodes being arranged in order of their event times and the value lists being associated with the resources on a cumulative basis as bookings are made and arranged in order of rank; and locating each new node in the value list of the lowest possible rank.

12. A method as in claim 11, comprising the further step of determining if a resource can be made available to a user between times t1 and t2 by scanning down a value list of highest rank between times t1 and t2.

13. A method as in claim 11 which each node has a time pointer for pointing to the next node in said time list and a value pointer for pointing to the next node in its respectively associated value list.

14. A method as in claim 13, in which the operation of booking one of the resources to a user for a period beginning at time t1 and ending at time t2 comprises the steps of:

creating a first node containing data relating to the beginning of the booking period and a second node containing data relating to the end of the booking period;

adjusting value pointers of the nodes just before the times t1 and t2 so that each of the nodes between times t1 and t2 is raised to a value list which is one value list higher in rank than its previous value list;

inserting the first and second nodes into the time list;

inserting the second node into a respective one of the value lists; and inserting the first node into a respective one of the value lists.

15. A method as in claim 13 in which the operation of removing a booking of one of the resources which is scheduled at begin at a time t1 and end at a time t2 comprises the steps of:

finding the node which contains data relating to the beginning of the booking and the node which contains data relating to the end of the booking;

adjusting value pointers of the nodes just before times t1 and t2 so that each of the nodes between times t1 and t2 is lowered into a value list which is one value list lower in rank than its previous value list;

removing the nodes relating to the booking from its value list; and removing the nodes relating to the booking from the time list.

* * * * *